United States Patent Office 2,868,767
Patented Jan. 13, 1959

2,868,767

CURING OF EPOXY RESINS

Henry A. Cyba, Chicago, and Ralph B. Thompson, Hinsdale, Ill., assignors to Universal Oil Products Company, Des Plaines, Ill., a corporation of Delaware No Drawing. Application December 20, 1956
Serial No. 629,487

10 Claims. (Cl. 260—47)

This invention relates to the curing of epoxy resins and more particularly to the use of a novel curing agent therefor.

Epoxy resins are more or less of recent origin and have been found to be of great utility in numerous applications. These resins are useful as bonding agents and laminates as, for example, in the lamination of glass cloth, in bonding metal to metal, metal to wood, wood to wood, etc. The resin also is used in plastic tooling, insulation, paints, protective coatings, etc. Regardless of the particular use, the epoxy resins are furnished as viscous liquids, semi-solids or solids, and subsequently are cured either at ambient temperature or by heating in the presence of a suitable curing agent.

The epoxy resins are formed by the reaction of a 1,2-epoxy compound and a dihydric phenol. The preferred 1,2-epoxy resins are prepared by the reaction of epichlorhydrin with Bis-Phenol-A (2,2-bis-(4-hydroxyphenyl)-propane), generally in alkaline solution. Epoxy resins also are prepared from other 1,2-epoxy compounds including, for example, polyglycidyl ethers of ethylene glycol, propylene glycol, trimethylene glycol, diethylene glycol, triethylene glycol, glycerol, dipropylene glyco, etc. Similarly, other dihydric phenols may be employed, including resorcinol, catechol, hydroquinone, 4,4'-dihydroxybenzophenone, 1,1-bis-(4-hydroxyphenyl)-ethane, 1,1 - bis - (4 - hydroxyphenyl) - butane, 2,2 - bis - (4 - hydroxyphenyl)-butane, (Bis-Phenol-B), 1,5-dihydroxynaphthylene, etc. It is understood that the epoxy resins formed from the various reactants mentioned above are not necessarily equivalent and, furthermore, that the exact compositions of the epoxy resins are dependent upon the molecular proportions of the epoxy compound and dihydric phenol employed in its preparation.

Regardless of the method of preparation, the epoxy resin must be cured in order to form the desired final product. In many cases, the epoxy resin is recovered as a viscous liquid and is converted by curing into a final hard product. In other cases, the epoxy resin is a semi-solid or solid which is soluble in suitable organic solvents or liquefied by mild heating and then is converted into the desired final product by proper curing. As hereinbefore set forth, the present invention provides a novel agent for use in the curing of epoxy resins.

In accordance with the present invention, curing of epoxy resins is effected in the presence of a curing agent comprising the condensation product of an N,N-dialkyl-alkanolamine with a polycarboxylic acid, anhydride or ester thereof or the condensation product of an N,N-dialkyl-alkanolamine with the reaction product of a terpene and an alpha, beta-unsaturated polycarboxylic acid, anhydride or ester thereof.

Any suitable N,N-dialkyl-alkanolamine may be employed in accordance with the present process. Preferably, the N,N-dialkyl-alkanolamine contains not more than about 6 carbon atoms between the nitrogen and hydroxyl groups and still more preferably from 2 to 4 carbon atoms. Also it is preferred that the alkyl groups attached to the nitrogen atom are the same and contain less than about twelve carbon atoms each. Illustrative examples of the preferred N,N-dialkyl-alkanolamines include N,N-diethyl-ethanolamine, N,N-dipropyl-ethanolamine, N,N-dibutyl-ethanolamine, N,N-diamyl-ethanolamine, N,N-dihexyl-ethanolamine, N,N-diheptyl-ethanolamine, N,N-dioctyl-ethanolamine, etc., N,N-diethyl-propanolamine, N,N-dipropyl-propanolamine, N,N-dibutyl-propanolamine, N,N-diamyl-propanolamine, N,N-dihexyl-propanolamine, N,N-diheptyl-propanolamine, N,N-dioctyl-propanolamine, etc., N,N-diethyl-butanolamine, N,N-dipropyl-butanolamine, N,N-dibutyl-butanolamine, N,N-diamyl-butanolamine, N,N-dihexyl-butanolamine, N,N-diheptyl-butanolamine, N,N-dioctylbutanolamine, etc. The specific compounds hereinbefore set forth are particularly preferred. It is understood that other suitable N,N-dialkyl-alkanolamines may be employed, including those in which the ethanol, propanol, or butanol portions of the compounds have a substituent or substituents and particularly alkyl substituents attached to one or more of the carbon atoms. Still other N,N-dialkyl-alkanolamines include N,N-dialkyl-methanolamine, N,N-dialkyl-pentanolamine, N,N-dialkyl-hexanolamine, etc., in which the substituents attached to the nitrogen atoms are alkyl groups selected from methyl, ethyl, propyl, butyl, amyl, hexyl, heptyl, octyl, monyl, decyl, undecyl, dodecyl, etc. In some cases, N,N-dialkyl-alkanolamines in which the alkyl substituents are different may be employed, the alkyl groups being selected from those specifically set forth hereinbefore, although such compounds generally are not readily available and, therefore, usually are not preferred. It is understood that the various N,N-dialkyl-alkanolamines which may be employed are not necessarily equivalent and that the specific compound to be employed will be selected with reference to the acid with which it is to be condensed. Furthermore, it is understood that a mixture of N,N-dialkyl-alkanolamines may be employed and preferably are selected from those specifically set forth herein.

In one embodiment, the N,N-dialkyl-alkanolamine is condensed with a polycarboxylic acid. The polycarboxylic acid preferably comprises an aliphatic dicarboxylic acid. Illustrative dicarboxylic acids include oxalic, malonic, succinic, glutaric, adipic, pimelic, suberic, azelaic, sebacic, maleic, fumaric, citraconic, mesaonic, etc. While the dicarboxylic acids are preferred, it is understood that polycarboxylic acids containing three, four or more carboxylic acid groups may be employed. Furthermore, it is understood that a mixture of polycarboxylic acids and particularly of dicarboxylic acids may be used. A number of relatively inexpensive dicarboxylic acids comprising a mixture of these acids are marketed commercially under various trade names, including "VR–1 Acid," "Dimer Acid," etc., and these acids may be used in accordance with the present invention. For example, "VR–1 Acid" is a mixture of dicarboxylic acids and has an average molecular weight of about 1000, is a liquid at 77° F., has an acid number of about 150 and an iodine number of about 36. It is believed to contain about 35 carbon atoms per molecule.

While the polycarboxylic acid may be employed, advantages appear to be obtained when using anhydrides thereof and particularly alkenyl-acid anhydrides. A preferred alkenyl-acid anhydride is dodecenyl-succinic anhydride. Other alkenyl acid anhydrides include butenyl-succinic anhydride, pentenyl-succinic anhydride, hexenyl-succinic anhydride, heptenyl-succinic anhydride, octenyl-succinic anhydride, nonenyl-succinic anhydride, decenyl-succinic anhydride, undecenyl-succinic anhydride, tridecenyl-succinic anhydride, tetradecenyl-succinic anhydride, pentadecenyl-succinic anhydride, hexadecenyl-succinic anhydride, heptadecenyl-succinic anhydride, octadecenyl-succinic anhydride, nonadecenyl-succinic anhydride, eicosenyl-succinic anhydride, etc. While the alkenyl-succinic anhydrides are preferred, it is understood that the alkyl-succinic anhydrides may be employed, the alkyl groups preferably corresponding to the alkenyl groups hereinbefore specifically set forth. Similarly, while the aliphatic succinic anhydrides are preferred, it is understood that the anhydrides and particularly aliphatic-substituted anhydrides of other acids may be employed including, for example, glutaric anhydride and particularly aliphatic glutaric anhydrides, etc. Also, it is understood that esters of the polycarboxylic acids may be employed, the ester group being selected from alkyl, alkaryl, aralkyl, aryl and cycloalkyl substituents replacing one or more of the hydrogen atoms of the carboxylic acid groups.

In another embodiment, the N,N-dialkyl-alkanolamine is condensed with the reaction product of a terpene and alpha, beta-unsaturated polycarboxylic acid, anhydride or ester. The reaction product will comprise primarily the anhydride but the acid and/or ester also will be present. Any suitable terpenic compound may be reacted with any suitable alpha, beta-unsaturated polycarboxylic acid, anhydride or ester to form the reaction product for subsequent condensation with the N,N-dialkyl-alkanolamine. In one embodiment a terpene hydrocarbon having the formula $C_{10}H_{16}$ is employed, including alpha-pinene, beta-pinene, dipentene, d-limonene, l-limonene and terpinoline. These terpene hydrocarbons have boiling points ranging from about 150° to about 185° C. In another embodiment the terpene may contain three double bonds in monomeric form, including terpenes as allo-o-cymene, o-cymene, myrcene, etc. Other terpenic compounds include alpha-terpinene, p-cymene, etc. Also included as terpenic compounds are rosins comprising the terpenic hydrocarbons and/or terpenic acids. These rosins and acids generally are tricyclic compounds. However, they are obtained from pine trees and therefore may be included in the broad classification as terpene or terpenic compounds.

As hereinbefore set forth, the terpene is reacted with an alpha,beta-unsaturated polycarboxylic acid, anhydride or ester thereof. Any unsaturated polycarboxylic acid having a point of unsaturation between the alpha and beta carbon atoms may be employed. Illustrative unsaturated dicarboxylic acids include maleic acid, fumaric acid, citraconic acid, mesaconic acid, aconitic acid, itaconic acid, etc. While the dicarboxylic acids are preferred, it is understood that alpha,beta-unsaturated polycarboxylic acids containing three, four or more carboxylic acid groups may be employed. Furthermore, it is understood that a mixture of alpha, beta-unsaturated polycarboxylic acids and particularly of alpha,beta-unsaturated dicarboxylic acids may be used.

While the alpha-beta-unsaturated polycarboxylic acid may be employed, advantages appear to be obtained in some cases when using the anhydrides thereof. Illustrative anhydrides include maleic anhydride, citraconic anhydride, aconitic anhydride, itaconic anhydride, etc. It is understood that a mixture of anhydrides may be employed and also that the anhydride may contain substituents and particularly hydrocarbon groups attached thereto. Furthermore, it is understood that the various anhydrides are not necessarily equivalent. Also, it is understood that esters of the alpha,beta-unsaturated polycarboxylic acids may be employed, the ester group being selected from alkyl, alkaryl, aralkyl, aryl and cycloalkyl substituents replacing one or more of the hydrogen atoms of the carboxylic acid groups.

The reaction of terpene and alpha, beta-unsaturated acid, anhydride or ester generally is effected at a temperature of from about 150° to about 300° C., and preferably of from about 160° to about 200° C. The time of heating will depend upon the particular reactants and may range from 2 hours to 24 hours or more. When desired, a suitable solvent may be utilized. Following the reaction, impurities or unreacted materials may be removed by vacuum distillation or otherwise, to leave a resinous product which may be a viscous liquid or a solid.

A terpene-maleic anhydride reaction product is available commercially under the trade name of "Petrex Acid." This acid is a stringy, yellow-amber colored mass and is mostly dibasic. It has an acid number of approximately 530, a molecular weight of approximately 215 and a softening point of 40°–50° C.

Another reaction product is available commercially under the trade name of "Lewisol 40 Acid." This is a tricarboxylic acid and is formed by the reaction of fumaric acid and rosin. It is a hard, brittle solid having a softening point of 150°–160° C. and a specific gravity at 25/25° C. of 1.178.

The condensation of N,N-dialkyl-alkanolamine and polycarboxylic acid, anhydride or ester or with the reaction product of terpene and alpha,beta-unsaturated polycarboxylic acid, anhydride or ester may be effected in any suitable manner. This reaction generally is effected at a temperature above about 80° C. and preferably at a higher temperature which usually will not exceed about 200° C., although higher or lower temperatures may be employed under certain conditions. The exact temperature will depend upon whether a solvent is used and, when employed, on the particular solvent. For example, with benzene as the solvent, the temperature will be in the order of 80° C., with toluene the temperature will be in the order of 120° C., and with xylene in the order of 150°–155° C. Other preferred solvents include cumene, naphtha, decalin, etc. Any suitable amount of the solvent may be employed but preferably should not comprise a large excess because this will tend to lower the reaction temperature and slow the reaction. Water formed during the reaction may be removed in any suitable manner including, for example, by operating under reduced pressure, by removing an azeotrope of water-solvent, by distilling the reaction product at an elevated temperature, etc. A higher temperature may be utilized in effecting the reaction in order to remove the water as it is being formed. However, for many uses, the reaction need not go to completion, but in any event at least a substantial portion of the reaction product will comprise that formed by the condensation of the N,N-dialkyl-alkanolamine with the acid component.

In general, the condensation is effected using equivalent acid or potential acid groups per total amino and hydroxyl groups. However, it is understood that the total acid or potential acid groups may range from about 0.5 to about 2 equivalents thereof per equivalent of total amino and hydroxyl groups.

In still another embodiment the curing agent comprises the mixed condensation product of an N,N-dialkylalkanolamine, an N-alkyl-dialkanolamine and polycarboxylic acid, anhydride or ester thereof or the reaction product of terpene and alpha, beta-unsaturated polycarboxylic acid, anhydride or ester thereof. The N-alkyl-dialkanolamine preferably contains not more than about 6 carbon atoms between the nitrogen and hydroxyl group and still more preferably from 2 to 4 carbon atoms. Similarly, the alkyl substituent attached to the nitrogen atom preferably contains not more than about 12 carbon atoms and still more preferably from 2 to 8 carbon atoms. Illustrative examples of preferred N-alkyldialkanolamines include N-ethyl-diethanolamine, N-propyl-diethanolamine, N-butyl-diethanolamine, N-amyl-diethanolamine, N - hexyl - diethanolamine, N - heptyl - diethanolamine, N - octyl - diethanolamine, N - nonyl - diethanolamine, N-decyl-diethanolamine, N-undecyl-diethanolamine, N-dodecyl-diethanolamine, etc., N-ethyl-dipropanolamine, N-propyl-dipropanolamine, N-butyl-dipropanolamine, N- amyl-dipropanolamine, N-hexyl-dipropanolamine, N-heptyl-dipropanolamine, N-octyl-dipropanolamine, N-nonyl-dipropanolamine, N-decyl-dipropanolamine, N-undecyl-dipropanolamine, N-dodecyl-dipropanolamine, etc., N-ethyl-dibutanolamine, N-propyl-dibutanolamine, N-butyl-dibutanolamine, N-amyl-dibutanolamine, N-hexyl-dibutanolamine, N-heptyl-dibutanolamine, N-octyl-dibutanolamine, N-nonyl-dibutanolamine, N-decyl-dibutanolamine, N - undecyl - dibutanolamine, N - dodecyl - dibutanolamine, etc. While these are the preferred N-alkyl-alkanolamines, it is understood that N-alkyl-dimethanolamines, N-alkyl-dipentanolamines, N-alkyl-dihexanolamines, etc. may be employed and that the alkyl substituent preferably is selected from those hereinbefore specifically set forth. Here again, it is understood that the various N-alkyl-dialkanolamines which may be employed are not necessarily equivalent and that the specific compound to be used will be selected with reference to the specific N,N-dialkylalkanolamine and polycarboxylic acid, anhydride or ester also employed. Furthermore, it is understood that a mixture of N-alkyl-dialkanolamines may be utilized in some cases and preferably are selected from those specifically set forth herein.

A particularly preferred condensation product comprises that formed by the condensation of 0.4 equivalent of N,N-diethyl-ethanolamine and 0.6 equivalent of N-methyl-diethanolamine with one equivalent of Petrex Acid. This condensation is effected in substantially the same manner as hereinbefore described, preferably using xylene as a solvent. The xylene then is removed by distillation under vacuum. In general, it is preferred that the N,N-dialkylethanolamine is employed in a concentration of from about 0.3 to about 0.6 equivalent per one equivalent of the terpene reaction product and that the N-alkyl-dialkanolamine is used in a concentration of from about 0.4 to about 0.7 equivalent per one equivalent of terpene reaction product. In the preferred embodiment, the total of the two alkanolamines are condensed with one equivalent of the terpene reaction product. The equivalents of the alkanolamine is determined by the sum of the hydroxyl groups in the two alkanolamines. The equivalent of the terpene reaction is determined by the number of carboxylic acid or potential carboxylic acid groups. As hereinbefore set forth, the mixed condensation of the N,N-dialkyl-alkanolamine, N-alkyl-dialkanolamine and polycarboxylic acid, terpene reaction product, etc., is effected in the same manner as previously described in connection with the other condensations.

In some cases, additional advantages are obtained when the condensation is effected in the presence of certain other components. For example, it has been found that the presence of diethylene glycol in the condensation of dodecenyl succinic anhydride, N,N-diethyl-ethanolamine and N-methyl-diethanolamine produced a satisfactory curing agent. The use of the glycol served to form a product of increased molecular weight. It is understood that other suitable glycols, glycol ethers, glycol esters and glycol ether-esters may be utilized.

From the preceding description, it will be noted that a number of different preparations may be made and used in accordance with the present invention. It is understood that the different curing agents are not necessarily equivalent in the same or different epoxy resins. The selection of the specific curing agent to be employed is dependent upon the specific epoxy resin and upon the final product desired. Certain of these curing agents will be more effective in some epoxy resins, while others will be more effective in other epoxy resins.

In addition to the fact that the curing agents of the present invention are particularly effective for the purpose, the curing agents offer several important advantages over those disclosed in the prior art. In the first place, the curing agents of the present invention either are non-toxic or non-sensitive or of decreased toxicity or of decreased sensitivity. It is apparent that this is of considerable advantage because of reduced hazard to the workers handling the curing agent and to the workers or users of the cured epoxy resins. Another important advantage to the curing agents of the present invention is that they are of increased solubility in the resin mix and this, in turn, facilitates intimate mixing of the curing agent and epoxy resins. Still another important advantage to some of the curing agents of the present invention is that the epoxy resin expands during curing. This is of considerable advantage because expansion of the resin during curing offsets contraction encountered during curing with prior curing agents. It is readily apparent that a curing agent which will cause expansion instead of contraction during curing considerably improves the final product and ease of preparing the desired cured product.

Curing of the epoxy resins is effected in any suitable manner. The temperature and time of heating and concentration of curing agent will depend upon the specific epoxy resin employed and upon the pot life desired. The properties of the epoxy resin itself depend upon the number of epoxy groups in the resin and the method of manufacture. In general, the concentration of curing agent may range from about 2 to about 200% by weight of the resin, but usually will be within the range of from about 5 to about 100% by weight of the resin. The specific curing procedure will depend upon the particular application of the epoxy resin. In one embodiment, the curing agent may be commingled with the epoxy resin and the mixture heated to a temperature which will give a pot life of from about 0.5 to 1 hour or more, and the mixture then is placed in suitable molds and allowed to set into the desired pattern. In another embodiment, the curing agent is mixed with the epoxy resin and the mixture used as bonding agent in laminates which may be heated and pressed at the same time, or the heating may precede the pressing, in which case the heating is controlled to give a sufficient pot life to allow application of the mixture to the laminate. It is understood that any suitable method of effecting the curing may be employed and, as hereinbefore set forth, the specific procedure will depend upon the particular application of the epoxy resin.

When desired, a suitable solvent, filler, thixotropping agent, diluent, etc., may be incorporated in the epoxy resin and/or the curing agent prior to curing. When the resin is supplied as a solid, it may be dissolved in a suitable solvent, and the curing agent intimately admixed therewith. Any suitable solvent may be employed. Illustrative solvents include ketones as acetone, methyl ethyl ketone, methyl isobutyl ketone, isophorone, diacetone alcohol, etc., ether alcohols as methyl, ethyl or butyl ether of ethylene glycol or diethylene glycol, Cellosolve, etc., chlorinated solvent such as trichloropropane, trichlorobutane, chloroform, etc. The filler to be employed will depend upon the purpose for which the epoxy resin is to be used. Illustrative fillers include powdered metals and metal oxides such as powdered iron oxide, aluminum oxide, etc., copper, aluminum, etc., silica, inorganic silicates, sand, glass, asbestos, carbon, calcium carbonate etc. In order to prevent the filler from settling during curing, an organophilic thixotropping agent may be employed and this may be selected from any of the suitable commercially available materials. Diluents such as hydrocarbons including, for example, benzene, toluene, xylene, ethylbenzene, cumene, etc., may be employed, particularly with liquid resins. This serves to reduce the viscosity and to increase the useful pot life without seriously affecting the final properties of the resin.

When desired, the epoxy resin, either with or without a solvent, may be heated mildly prior to admixing the curing agent therewith. The mild heating generally will be within the range of from about 23° to 60° C. or more. It is important that the curing agent be intimately mixed with the resin, and this may be accomplished by hand mixing using a paddle, particularly in batch preparations, by the use of a mechanically rotating blade in continuous or batch preparations, or in any other suitable manner.

The temperature of curing will vary in the manner hereinbefore set forth, but usually will be within the range of from about 100° to 300° C., although in some cases higher or lower temperatures may be employed. The time of heating also will depend upon the particular epoxy resin and curing agent employed, as well as the use to be made of the resin. The time generally will be from about 10 minutes to 20 hours or more, depending upon whether it is a fast or slow cure. In general, shorter times are employed with higher temperatures and, likewise, longer times with lower temperatures. While the curing may be effected at atmospheric pressure, superatmospheric pressure may be utilized in the curing and may range up to 100 pounds or more per square inch. The curing is an exothermic reaction and, when desired, means for controlling the heat of reaction may be employed.

The following examples are introduced to illustrate further the novelty and utility of the present invention but not with the intention of unduly limiting the same.

*Example I*

The epoxy resin used in this example is liquid at atmospheric conditions and has a viscosity at 25° C. of 50–150 poises. This resin is a diglycidyl ether of Bis-Phenol-A and has an epoxide value (grams of resin containing one gram-equivalent of epoxide) of 175–210.

The curing agent used in this example is the condensation product of 0.4 equivalent of N,N-diethyl-ethanolamine with 0.4 equivalent of Petrex Acid. More specifically, 46.8 grams of N,N-diethyl-ethanolamine and 43 grams of Petrex Acid were dissolved in 100 grams of xylene and the mixture was boiled under refluxing conditions. 3.4 cc. of water was collected. The xylene was removed by distillation under vacuum. The product is a brownish-amber liquid of high viscosity.

Two parts by weight of the condensation product formed in the above manner were intimately mixed with 8 parts by weight of the epoxy resin described above, and the mixture was heated at 100° C. for 7 hours. After 3 hours at 100° C., considerable gelling was observed. After 7 hours at this temperature, the material was a plastic solid which set to a hard mass upon cooling to room temperature.

*Example II*

The curing agent used in this example was prepared by the mixed condensation of 0.314 equivalent of N,N-diethylethanolamine, 0.472 equivalent of N-methyl-diethanolamine and 0.786 equivalent of Petrex Acid. More specifically, 36.74 grams of N,N-diethyl-ethanolamine, 28.08 grams of N-methyl-diethanolamine and 83.35 grams of Petrex Acid were dissolved in 120 cc. of xylene and the mixture was boiled under refluxing conditions. Six cc. of water was collected. The xylene was removed by vacuum distillation.

The condensation product prepared in the above manner was utilized in different concentrations in different portions of the epoxy resin described in Example I:

In the first run, 2 parts by weight of the condensation product was intimately mixed with 8 parts by weight of epoxy resin and the mixture was heated at 100° C. for 19 hours. The resin set to a hard somewhat plastic mass which upon cooling to room temperature became very hard and expanded. This run was made in a glass beaker and expansion of the cured resin resulted in breaking of the beaker. As hereinbefore set forth, the use of a curing agent which results in expansion of the cured product is desirable for the reasons previously explained. It will be noted that the curing agent was used in a concentration of 20% by weight of the total mass in this particular run.

Another portion of the condensation product described above was utilized in a concentration of 10% by weight of the total mass in another portion of the epoxy resin described above. The mixture was heated at 100° C. for 5.25 hours, during which time the resin set to a solid hard mass.

Another portion of the condensation product described above was utilized in a concentration of 5% by weight of the total mass in another portion of the epoxy resin described above. The mixture was heated at 100° C. for 21 hours. After such heating, the resin was somewhat softer than the runs using a higher concentration of this curing agent, but the resin set to a hard mass upon cooling to room temperature.

*Example III*

As hereinbefore set forth, satisfactory curing agents may be prepared when using a mixture of N-alkyl-diethanolamines. This is illustrated by the present example, in which the curing agent comprised the mixed condensation product of 0.107 equivalent of N,N-diethylethanolamine, 0.402 equivalent of N-methyl-diethanolamine, 0.027 equivalent of N-tallow-diethanolamine and 0.536 equivalent of Petrex Acid. This condensation product was prepared using xylene as the solvent. The theoretical amount of water was collected during the refluxing, and the xylene was subsequently removed by vacuum distillation.

When the condensation product prepared in the above manner was utilized in a concentration of 20% by weight of the total mass, and the mixture heated at 100° C. for 27 hours, a hard resin was obtained.

When used in a concentration of 10% by weight of the total mass, and the mixture heated at 100° C. for 5.25 hours, the resin was plastic but set to a hard mass upon cooling to room temperature.

When the condensation product described above was used in a concentration of 5% by weight of the total mass and heated at 100° C. for 21 hours, the resin was a hard plastic mass, which set to a hard mass upon cooling to room temperature.

*Example IV*

The curing agent of this example was prepared by the condensation of 0.1 equivalent of N,N-diethyl-ethanolamine and 0.1 equivalent of VR-1 Acid. More specifically, 11.7 grams of N,N-diethyl-ethanolamine and 68.4 grams of VR-1 Acid were dissolved in 100 cc. of xylene and refluxed. 1.6 cc. of water was collected. The xylene was removed by distillation. The product is a dark brown, heavy liquid.

The condensation product prepared in the above manner was utilized in a concentration of 20% by weight of the total mass in another portion of the epoxy resin described above, and the mixture was heated at 100° C. for 7 hours. This resulted in a medium hard cure.

*Example V*

The curing agent of this example was prepared in the same manner as described in Example IV, except that 0.2 equivalent of N,N-diethyl-ethanolamine were used instead of one equivalent. Here again, the product is a dark brown, viscous liquid.

When used in a concentration of 20% by weight of the total mass in another portion of the epoxy resin described above, and the mixture heated at 100° C. for 7 hours, the resin set to a hard somewhat plastic mass after cooling to room temperature.

*Example VI*

As hereinbefore set forth, the condensation may be effected in the presence of a glycol. The condensation product of this example was prepared by the reaction of 0.01 equivalent of N,N-diethyl-ethanolamine, 0.192 equivalent of N-methyl-diethanolamine, 0.134 equivalent of diethylene glycol and 0.336 equivalent of dodecenyl-succinic anhydride.

When the above mixed condensation product was used in a concentration of 20% by weight of the total mass in another portion of the epoxy resin described above and the mixture heated at 100° C. for 7 hours, a hard solid mass was obtained upon cooling to room temperature.

*Example VII*

It is essential that an N,N-dialkyl-alkanolamine be utilized in the condensation. This is illustrated in the present example in which a mass was prepared by the condensation of 0.554 equivalent of N-methyl-diethanolamine and 0.554 equivalent of Petrex Acid. This condensation was effected by dissolving the reactants in xylene and boiling under refluxing conditions, and the xylene removed by vacuum distillation.

The condensation product prepared in the above manner was insoluble in another portion of the epoxy resin described above, even at 100° C. The mixture was heated at 100° C. for 7 hours and gave no indication of any hardening of the resin.

We claim as our invention:

1. A method of curing an epoxy resin formed by the reaction of a dihydric phenol and a 1,2-epoxy compound selected from the group consisting of epichlorhydrin and polyglycidyl ethers of ethylene glycol, propylene glycol, trimethylene glycol, diethylene glycol, triethyene glycol, glycerol and dipropylene glycol, which comprises heating said resin in admixture with a curing agent comprising the condensation product of an N,N-dialkyl-alkanolamine with a substance selected from the group consisting of (1) polycarboxylic acid, (2) anhydride thereof, (3) ester thereof, and (4) the reaction product of a terpene hydrocarbon having the formula $C_{10}H_{16}$ and a boiling point ranging from about 150° to about 185° C. and a compound selected from the group consisting of an alpha, beta-unsaturated polycarboxylic acid, anhydride and ester thereof, said condensation product being formed by effecting the condensation at a temperature of from about 80° to about 200° C. and using a total of acid and potential acid groups of from about 0.5 to about 2 equivalents thereof per equivalent of total amino and hydroxyl groups.

2. A method of curing an epoxy resin formed by the reaction of epichlorhydrin and a dihydric phenol which comprises heating said resin in admixture with a curing agent comprising the condensation product of an N,N-dialkyl-ethanolamine with a polycarboxylic acid formed by effecting the condensation at a temperature of from about 80° to about 200° C. and using a total of acid groups of from about 0.5 to about 2 equivalents thereof per equivalent of total amino and hydroxyl groups.

3. A method of curing an epoxy resin formed by the reaction of epichlorhydrin and a dihydric phenol which comprises heating said resin in admixture with a curing agent comprising the condensation product of N,N-diethyl-ethanolamine with a dicarboxylic acid formed by effecting the condensation at a temperature of from about 80° to about 200° C. and using a total of acid groups of from about 0.5 to about 2 equivalents thereof per equivalent of total amino and hydroxyl groups.

4. A method of curing an epoxy resin formed by the reaction of epichlorhydrin and a dihydric phenol which comprises heating said resin in admixture with a curing agent comprising the condensation product of an N,N-dialkyl-ethanolamine with a polycarboxylic acid anhydride formed by effecting the condensation at a temperature of from about 80° to about 200° C. and using a total of potential acid groups of from about 0.5 to about 2 equivalents thereof per equivalent of total amino and hydroxyl groups.

5. A method of curing an epoxy resin formed by the reaction of epichlorhydrin and a dihydric phenol which comprises heating said resin in admixture with a curing agent comprising the condensation product of N,N-diethyl-ethanolamine with dodecenyl-succinic anhydride formed by effecting the condensation at a temperature of from about 80° to about 200° C. and using a total of potential acid groups of from about 0.5 to about 2 equivalents thereof per equivalent of total amino and hydroxyl groups.

6. A method of curing an epoxy resin formed by the reaction of epichlorhydrin and a dihydric phenol which comprises heating said resin in admixture with a curing agent comprising the condensation product of an N,N-dialkyl-alkanolamine with the reaction product of a terpene hydrocarbon having the formula $C_{10}H_{16}$ and a boiling point ranging from about 150° to about 185° C. and a compound selected from the group consisting of an alpha, beta-unsaturated polycarboxylic acid, anhydride and ester thereof, said condensation product being formed by effecting the condensation at a temperature of from about 80° to about 200° C. and using a total of acid and potential acid groups of from about 0.5 to about 2 equivalents thereof per equivalent of total amino and hydroxyl groups.

7. A method of curing an epoxy resin formed by the reaction of epichlorhydrin and a dihydric phenol which comprises heating said resin in admixture with a curing agent comprising the condensation product of N,N-diethyl-ethanolamine with the reaction product of a terpene hydrocarbon having the formula $C_{10}H_{16}$ and a boiling point ranging from about 150° to about 185° C. and maleic anhydride, said condensation product being formed by effecting the condensation at a temperature of from about 80° to about 200° C. and using a total of potential acid groups of from about 0.5 to about 2 equivalents thereof per equivalent of total amino and hydroxyl groups.

8. A method of curing an epoxy resin formed by the reaction of epichlorhydrin and a dihydric phenol which comprises heating said resin in admixture with a curing agent comprising the mixed condensation product of an N,N-dialkyl-alkanolamine, an N-alkyl-dialkanolamine and the reaction product of a terpene hydrocarbon having the formula $C_{10}H_{16}$ and a boiling point ranging from about 150° to about 185° C. and maleic anhydride, said condensation product being formed by effecting the condensation at a temperature of from about 80° to about 200° C. and using a total of potential acid groups of from about 0.5 to about 2 equivalents thereof per equivalent of total amino and hydroxyl groups.

9. A method of curing an epoxy resin formed by the reaction of epichlorhydrin and a dihydric phenol which comprises heating said resin in admixture with a curing agent comprising the mixed condensation product of an N,N-dialkyl-ethanolamine, an N-alkyl-diethanolamine and the reaction product of a terpene hydrocarbon having the formula $C_{10}H_{16}$ and a boiling point ranging from about 150° to about 185° C. and maleic anhydride, said condensation product being formed by effecting the condensation at a temperature of from about 80° to about 200° C. and using a total of potential acid groups of from about 0.5 to about 2 equivalents thereof per equivalent of total amino and hydroxyl groups.

10. A method of curing an epoxy resin formed by the reaction of epichlorhydrin and a dihydric phenol which comprises heating said resin in admixture with a curing agent comprising the mixed condensation product of N,N-diethyl-ethanolamine, N-methyl-diethanolamine and the reaction product of a terpene hydrocarbon having the formula $C_{10}H_{16}$ and a boiling point ranging from about 150° to about 185° C. and maleic anhydride, said condensation product being formed by effecting the condensation at a temperature of from about 80° to about 200° C. and using a total of potential acid groups of from about 0.5 to about 2 equivalents thereof per equivalent of total amino and hydroxyl groups.

References Cited in the file of this patent

UNITED STATES PATENTS 2,630,427    Hwa _____ Mar. 3, 1953